United States Patent [19]

Kuehl

[11] 4,033,067
[45] July 5, 1977

[54] HUMANE ANIMAL TRAP

[76] Inventor: John Kuehl, Brooks Village Road, Templeton, Mass. 01468

[22] Filed: Aug. 23, 1976

[21] Appl. No.: 716,760

[52] U.S. Cl. ..................................... 43/90; 43/92
[51] Int. Cl.² ..................................... A01M 23/26
[58] Field of Search ..................... 43/90, 92, 88, 93

[56] References Cited
UNITED STATES PATENTS

| | | | |
|---|---|---|---|
| 2,216,919 | 10/1940 | Lehn | 43/90 |
| 2,275,636 | 3/1942 | McFarland | 43/90 |
| 3,535,816 | 10/1970 | Montgomery et al. | 43/93 |
| 3,939,596 | 2/1976 | Webley | 43/90 |

*Primary Examiner*—Warner H. Camp
*Attorney, Agent, or Firm*—Charles R. Fay

[57] ABSTRACT

A humane animal trap has jaws and two spaced jaw closers, and two springs for the closers. One spring is relatively light and is triggered by the animal stepping on the usual trigger and the other spring is heavier and acts only after a delay. The jaws have adjacent one end thereof an enlarged sleeve, the animal struggling to escape from the trap drawing his leg into the sleeve and triggers the heavier spring.

10 Claims, 3 Drawing Figures

HUMANE ANIMAL TRAP

BACKGROUND OF THE INVENTION

Genuinely humane animal traps of the steel type have been long sought but none have been found to be satisfactory and it is the object of the present to provide such a trap.

SUMMARY OF THE INVENTION

This trap is based on already existing light traps either of the coil spring variety or the long spring variety, made by Victor Animal Trap Company, Lititz, Pa. sleeve There are a pair of jaws which are set and snapped together under spring power when the trigger is stepped upon as usual, but in the present case there are two separate springs one of which is a relatively light spring that closes the jaws on the animal's leg in the usual manner, the other spring being heavier and which closes the jaws tighter but only after a delay caused by the animal itself.

The jaws at one end thereof have a sleeve thereon. This sleeve is applied at corresponding ends of the jaws opposite the first jaw closer, under the influence of the weaker spring that closes the jaws in the first instance. There is a second jaw closer adjacent to the sleeve and this closer is held inactive against its spring pressure until such time as the animal pulls the trap away from the stake to which it is attached, whereupon the delayed action automatic trigger means is actuated to close the jaws still tighter but with the animals leg held within the sleeve and not in the jaw proper.

Additionally the jaws are recessed and rubber covered and diverge slightly in a direction away from the first closer to make it easier for the animal to drag itself toward the sleeve.

PREFERRED EMBODIMENT OF THE INVENTION

As stated this invention is based upon the Victor steel trap whether the coil spring type or the long spring type, but it is applicable to any leg trap having jaws. It has a pair of steel jaws 10 and 12 which are generally pivoted in any way desired such as by hooks or the like 14 held in brackets 18 located at the end of a longitudinal bar 19 upon which the parts of the trap are mounted. The trigger pan is indicated at 20 and the pivoted latch to hold the pan in ready position is indicated at 22.

Figure 1:
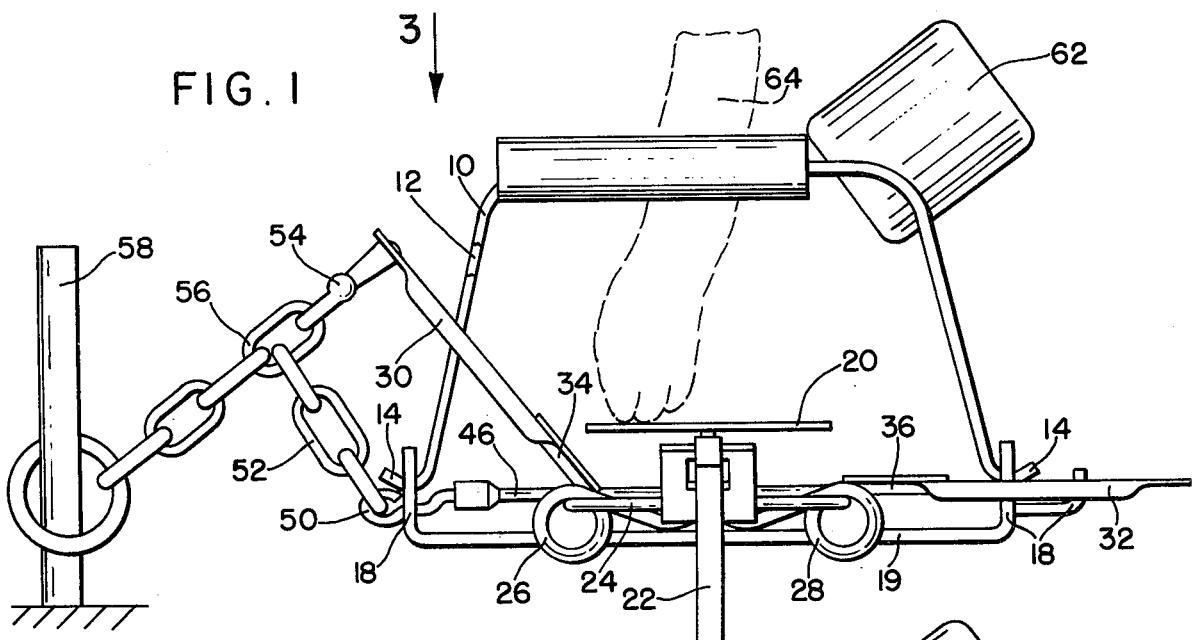
FIG. 1 is a view in elevation illustrating an embodiment of the present invention showing the same with the first jaw closer actuated.
Figure 2:
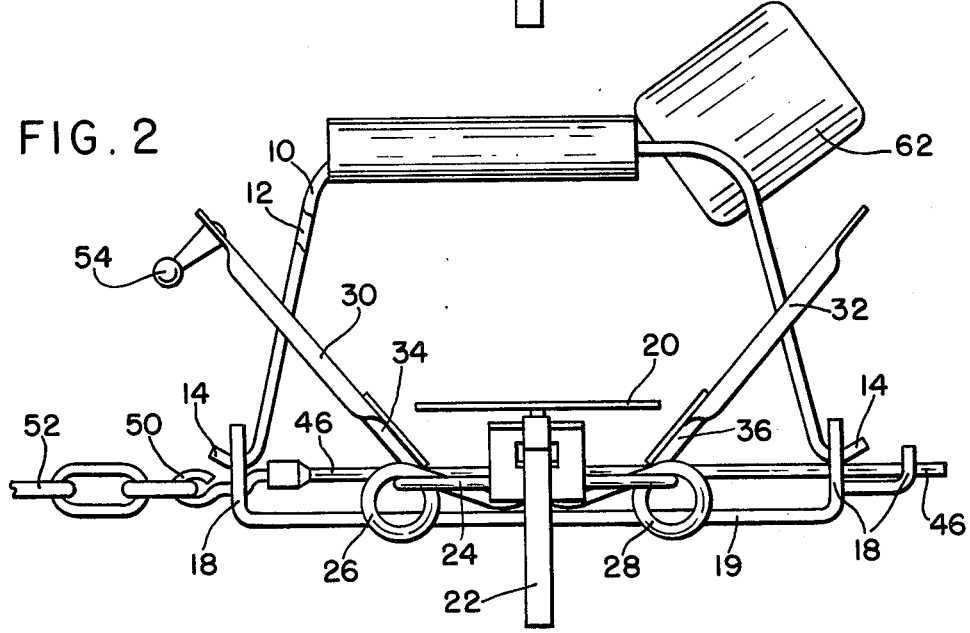
FIG. 2 is a similar view showing both closers having been actuated.
Figure 3:
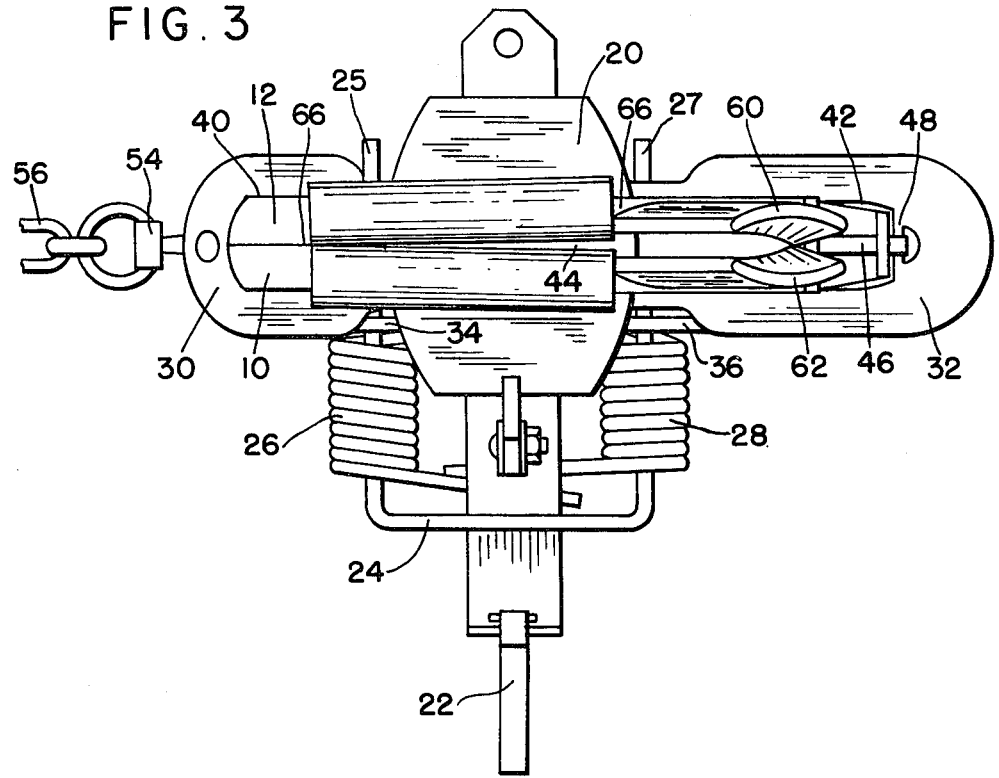
FIG. 3 is a plan view looking in the direction of arrow 3 in FIG. 1.

A U-shaped wire member 24 having legs 25 and 27 is mounted to pivot the jaw closers 30 and 32, and each spring is so arranged as to have a leg as at 34, 36 to pivot these closers upwardly, drawing the jaws together in a well-known manner. The jaws are located in apertures as at 40 and 42 in the closers 30 and 32. However, the springs 26 and 28 are separate and do not operate together, the spring 26 operating the jaw closer 30 upwardly from its latched horizontal position, to the angular position shown in FIG. 1 to draw the jaws 10 and 12 initially together. The jaws 10 and 12 are preferably rubber covered and have indentations forming a space as indicated at 44 in FIG. 3 so as to lightly hold the leg of the animal for a short period of time until it becomes fully trapped. The space 44 has divergent sides.

The closer 32 is triggered by means of an elongated rod 46 which runs just above the bar 19. This rod is slidable, being held in apertures in turned up ears 18,18 on bar 19. The rod has a free end at its right hand end, see FIG. 3, and this holds down closer 32 in cocked condition, FIG. 1, by engagement with a portion of closer 32 at 48. Rod 46 has a connection at the other end at 50 to a chain portion 52 which by snap ball arrangement 54 is temporarily secured to the underside of closer 30, and another chain portion 56 secures the whole trap to its stake which is indicated at 58.

The two jaws 10 and 12 are provided with sleeve halves 60 and 62. These are corresponding concaved faced portions which will hold the lower leg of the animal with the foot in the trap but without digging into the leg in any way, and they provide broad surfaces by which the animal is held without injuries. The leg of the animal is shown in dotted lines at 64, as initially trapped.

In the operation of the device the animal will step on the pan 20 which actuates closer 30 through weak spring 26. This brings the jaws together being stopped as at for instance points 66,66. The animal in attempting to escape the trap will now lunge away from the stake drawing its leg down the diverging edges of the jaws, as in space 44, to become lodged in the sleeve 60. When this happens the trap, being dragged to the right as in FIG. 1, and the stake remaining in fixed position, the rod 46 will be snapped to the left, thus releasing closer 32 for its heavier spring 28 to snap it up into the FIG. 3 position so that both ends of the trap are securely held and the animal's leg is held in the sleeve without damage.

The sleeve 60, 62 is preferably fixed with its axis inclined relative to the jaws and pointing at the chain portion 52 so there is no danger of the animal breaking its own leg by pulling away from the stake.

I claim:

1. A humane animal trap comprising a frame, a pair of pivoted jaws on the frame, a pair of springs, a pair of jaw closers, each spring being separately operatively associated with a single one of said jaw closers, the jaw closers being located at opposite ends of the jaws, means on said jaws forming a sleeve, said sleeve being at one end of said jaws adjacent to one of said closers, a pan, a latch for the pan, means causing the release of the one spring to activate the one of the jaw closers while the other jaw closer remains locked, and separate means for releasing said latter jaw closer.

2. The trap of claim 1 including means on said one jaw closer for temporary connection to a fixed object.

3. The trap of claim 2 including means for disconnecting said connection.

4. The trap of claim 3 wherein said connecting-disconnecting means comprises a snap and ball arrangement.

5. The trap of claim 2 wherein the sleeve has an axis substantially including the connection.

6. The trap of claim 1 wherein the separate means comprises a reciprocatory member, and means for moving the same.

7. The trap of claim 6 wherein the separate means includes a rod having a free end latching the said latter jaw closer.

8. The trap of claim 1 wherein said jaws include means forming a space between them.

9. The trap of claim 8 wherein said space has divergent sides leading to said sleeve.

10. The trap of claim 1 wherein the said latter jaw closer is adjacent the sleeve.

* * * * *